April 11, 1950 — L. R. GRUSS — 2,503,869
LANDING GEAR MECHANISM
Filed June 19, 1948 — 3 Sheets-Sheet 1
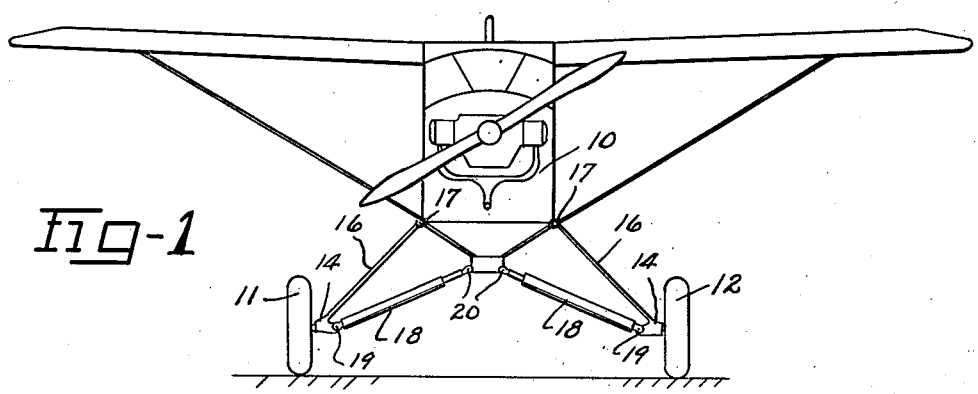
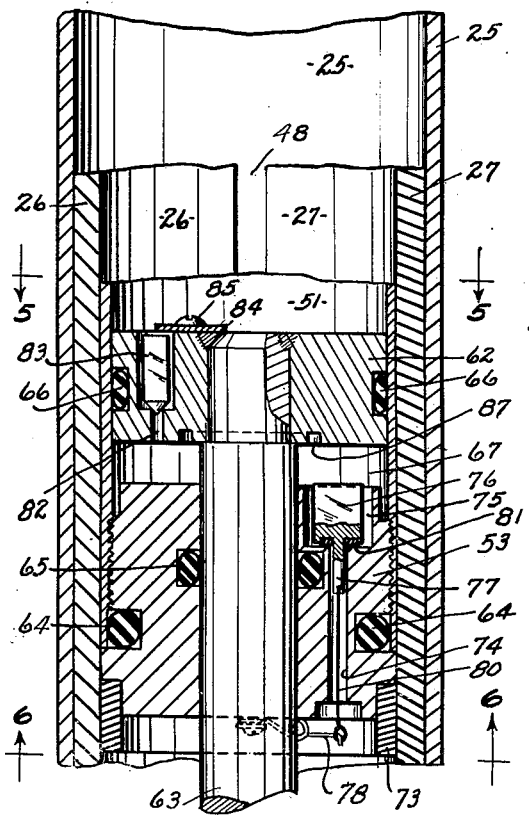
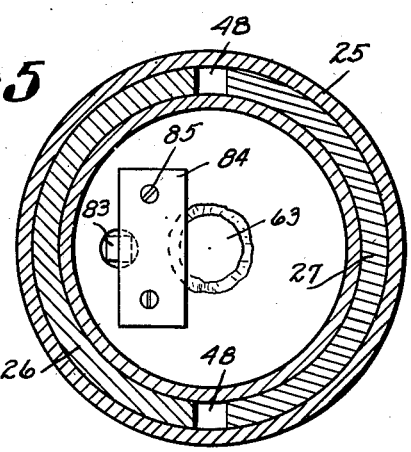
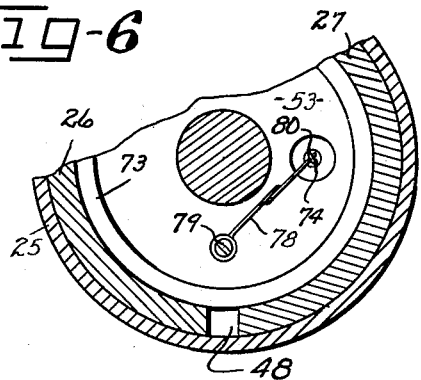
INVENTOR.
LUCIEN R. GRUSS
BY
Bates Teare & McBean
ATTORNEYS

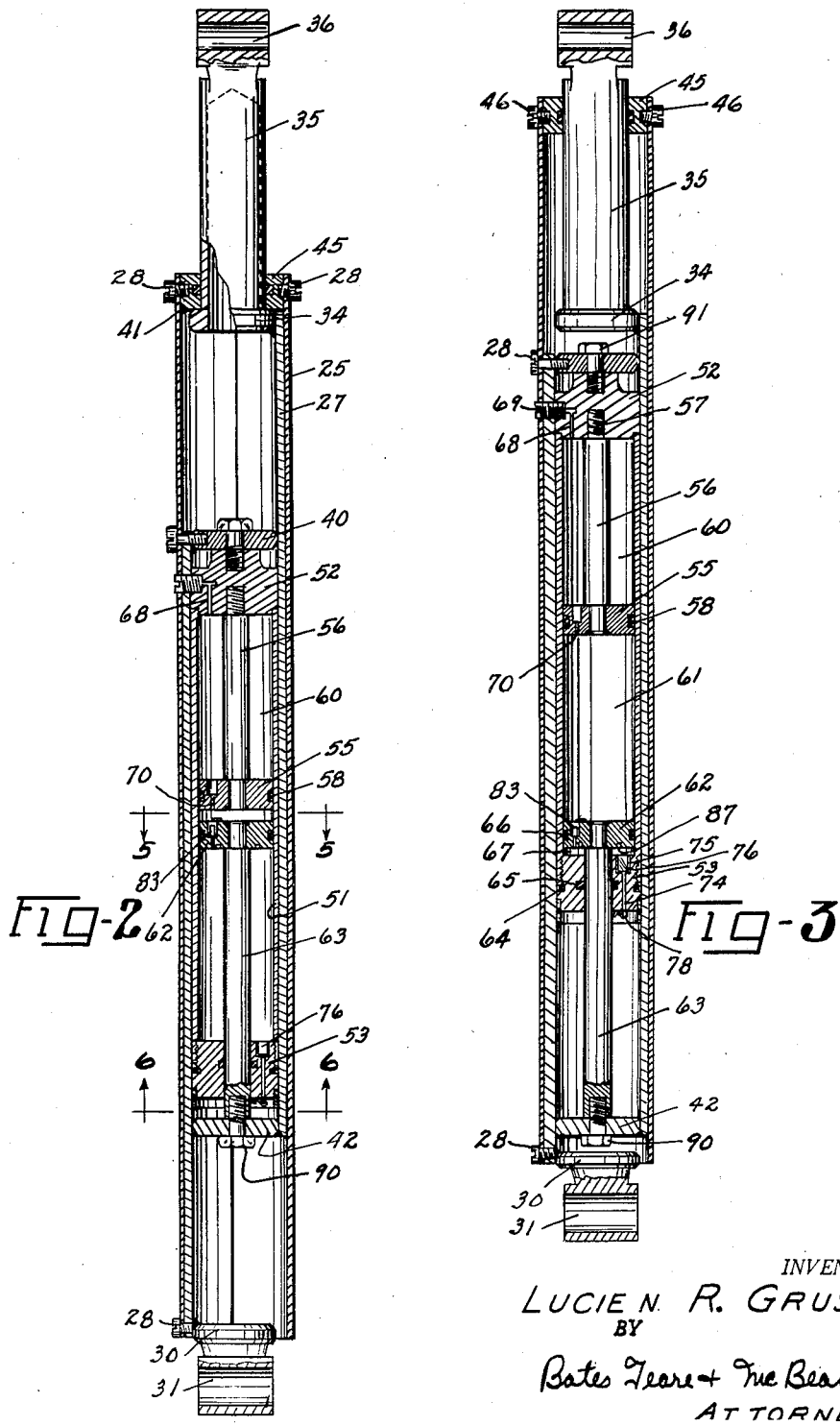

April 11, 1950 — L. R. GRUSS — 2,503,869
LANDING GEAR MECHANISM
Filed June 19, 1948 — 3 Sheets-Sheet 3
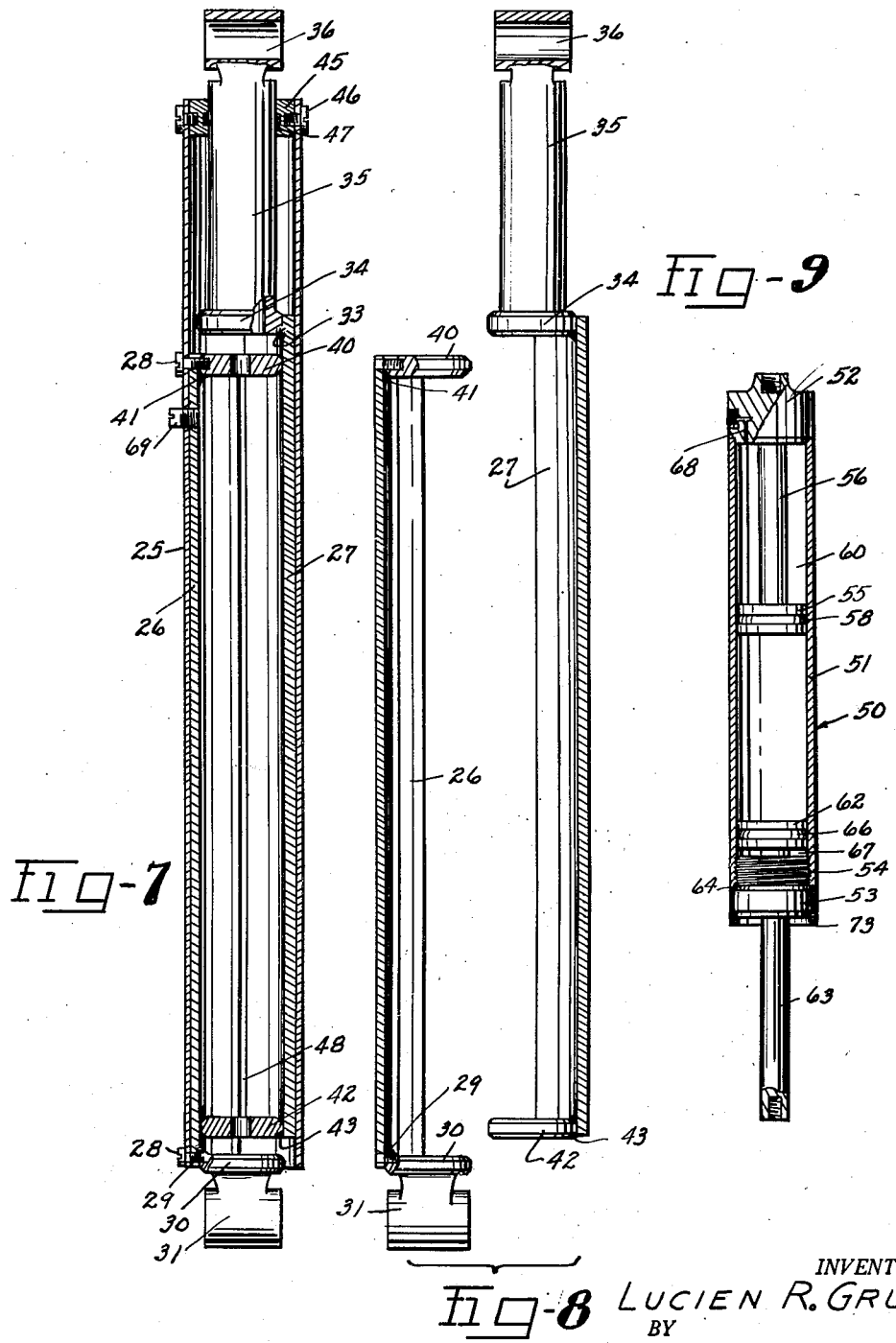
INVENTOR.
LUCIEN R. GRUSS
BY
Bates Teare + McBean
ATTORNEYS Patented Apr. 11, 1950

2,503,869

UNITED STATES PATENT OFFICE 2,503,869

LANDING GEAR MECHANISM

Lucien Robert Gruss, Middletown, Ohio

Application June 19, 1948, Serial No. 33,968

7 Claims. (Cl. 244—104)

This invention relates to improvements in aeroplane landing gear mechanisms, and to improvements in load cushioning or shock absorbing devices which may be used in such mechanisms. These, therefore, are the general objects of the present invention.

A more specific object of this invention is the provision of an improved fluid pressure load cushioning device which may be used as a support and shock absorber in aeroplane landing gear mechanisms and the like, and in which the fluid pressure will be maintained automatically as a result of contraction and expansion of the device during the normal use thereof.

Another object of the present invention is to provide an improved shock absorber or load cushioning mechanism for use between a pair of relatively movable members, which normally will tend to resiliently bring such members together and cushion the movements.

A further object of the invention is to provide an improved housing or harness for connecting and supporting a load cushioning device, such as a fluid shock absorbing mechanism, between a pair of movable members.

Other objects and advantages of the present invention will become more apparent from the following description in which reference is made to the accompanying drawings illustrating a preferred embodiment thereof.

In the drawings, Fig. 1 is a diagrammatic illustration of an aeroplane provided with the improved wheel supporting mechanism of the present invention; Fig. 2 is an axial section through the load cushioning device and the mechanism for connecting it to the structure of the plane, the connecting mechanism being illustrated in a fully expanded position; Fig. 3 is a section similar to Fig. 2 but illustrating the connecting mechanism in a contracted position; Fig. 4 is an enlarged sectional detail, the plane of the section being substantially the same as that of Fig. 2; Fig. 5 is a transverse section, as indicated by the lines 5—5 of Fig. 2; Fig. 6 is a fragmentary transverse section as indicated by the lines 6—6 on Fig. 2; Fig. 7 is a sectional view similar to Fig. 3 but illustrating the connecting mechanism or harness for supporting the shock absorbing mechanism in section, the shock absorbing mechanism having been removed therefrom; Fig. 8 is a sectional view illustrating the attaching members of the harness; and Fig. 9 is a sectional view illustrating the shock absorbing or load cushioning mechanism removed from the harness.

The mechanism illustrated is particularly well adapted for use in a wheel supporting structure for light-weight aeroplanes.

In Fig. 1, the fuselage 10 of an aeroplane is indicated as being supported by a pair of wheels 11 and 12. Each wheel is mounted on an axle bracket 14 which is connected to the fuselage by a bar or strut 16. The struts 16 are comparatively rigid and one end of each strut is secured to the respective axle bracket 14, while the other end is pivotally connected as at 17 with the fuselage 10. The movement of each wheel and strut 16 about their respective pivots 17 is restrained and controlled by struts 18. One end of the struts 18 is pivotally connected as at 19 with the respective axle bracket 14, and the other end is pivotally connected as at 20 to the fuselage 10 at a point spaced from the respective pivot 17.

The struts 18, hereinafter to be more fully described, each comprise a pair of telescopic members between which a load cushioning or shock absorbing device is positioned. The relation of the load cushioning device to the telescopic members is such that the device normally acts to contract the telescopic members, and thus reduce the length of the strut 18, and bring the wheels 11 and 12 together. The force of the contact between the plane and the ground causes an elongation of the strut 18, which is controlled and cushioned by the cushioning device as will hereinafter become more apparent.

Each strut 18, as heretofore mentioned, includes a pair of telescopic members which comprise a harness or housing for supporting the shock absorbing or cushioning device. This harness or housing comprises, as shown in Figs. 2, 7, 8 and 9, a tube or cylinder 25 within which a pair of elongated substantially semi-cylindrical sleeves 26 and 27 are mounted for telescopic movement relative to each other. The sleeve 26 is secured to the wall of the cylinder 25, as by bolts 28 and 29, and extends from the bottom of the cylinder upward, whereas the sleeve 27 is mounted for axial movement within the cylinder. Secured to the lower end of the sleeve 26, as by a weld 29, is a disc or piston 30 which carries an attaching member 31 for pivotally attaching the sleeve 26 to one of the movable members between which the cushioning device is to be used as, for instance, the axle supporting bracket 14, heretofore described. Secured to the upper end of the sleeve 27, as by a weld 33, is a disc or piston 34 to which is secured a plunger 35. This plunger projects outward beyond the upper end of the tube 25 and is provided with an attaching member 36 for pivotally connecting such sleeve to the other movable member with which the device is to be used as, for instance, the fuselage 10.

The sleeves 26 and 27 are substantially the same length, each being shorter than the cylinder by a distance somewhat greater than the maximum relative movement of the sleeves. A disc or piston 40 is secured to the upper end of the relatively stationary sleeve 26, as by a weld 41, while a similar disc or piston 42 is secured to the lower end of the sleeve 27 as by a weld 43. When positioned in the cylinder 25, the discs 40 and 42 are the innermost discs relative to the ends of the cylinder and are so arranged that they approach each other as the attaching members 31 and 36 are separated and move away from each other as the attaching members are brought together. While the discs 40 and 42 are welded to the inner surfaces of the respective sleeves, they slidably engage the inner surface of the other or mating sleeve, thus forming a comparatively rigid structure and insuring alignment of the attaching members 31 and 36.

The upper end of the cylinder 25 is provided with a dust ring 46 which is secured to the cylinder by bolts 47, and carries a packing or dust ring 48. The sleeves 26 and 27, as shown in Fig. 5, are each slightly less than a semi-cylinder in cross sectional area and are positioned opposite each other so as to provide longitudinal passageways 48 extending the length of the cylinder, thus insuring lubrication of the surfaces as well as preventing back pressure in the chamber 49 formed between the plunger 35 and the walls of the cylinder 25. While the end of the cylinder 25 is shown in the drawings as open to the exterior of the housing, it however may be closed by packing of a type which prevents ingress of dust but permits the air to flow therethrough in either direction.

As heretofore mentioned, the attaching members 31 and 34 are normally retained in a contracted position similar to that indicated in Figs. 7 and 3 by a fluid shock absorber or cushioning device contained within the housing. This device is generally indicated at 50 and is best illustrated in Figs. 2, 3 and 9. As there shown, the cushioning device comprises a cylinder 51 which is somewhat shorter than either the casing 25 or the sleeves 26 and 27. The cylinder 51 is closed at its upper end by an annular plug or wall 52, the external diameter of which is such as to provide a sliding fit between it and the sleeves 26 and 27. At its lower end the cylinder 51 is closed by an annular plug 53 which has a threaded connection 54 with the cylinder. The cylinder 51 has a partition 55 extending thereacross substantially midway between the inner faces of the plugs 52 and 53. This partition is shown as being secured to one end of a rod 56, the other end of which is threadingly secured as at 57 to the upper plug 52 of the cylinder 51. A packing ring, indicated at 58, is mounted in an annular recess formed in the cylindrical wall of the partition and prevents the flow of fluid between the chamber 60 formed above the partition and the chamber 61 formed below the partition.

A piston 62 is reciprocally mounted in the chamber 61. This piston is mounted on the upper end of a rod 63 which projects through an axial opening formed in the lower plug 53. Suitable packing rings 64 and 65 prevent the flow of fluid from the chamber 61 past the plug 53, while a similar packing ring 66 mounted in an annular groove formed in the piston 62 prevents the flow of fluid from the chamber 61 above the piston 62 to the chamber 67 formed beneath the piston 62.

In operation the cylinder 51 is partially filled with oil, for instance, a sufficient quantity to fill the cylinder chamber 61 between the upper surface of the piston 62 and the lower surface of the partition 55, and rise to a level slightly above the partition 55 so as to form an oil seal between the chambers 60 and 61. The remainder of the chamber 60 is then filled with a compressible fluid under pressure such as, for instance, air. The initial pressure in the chambers 60 and 61 is determined by the pressure required to support a load at rest as, for instance, the pressure required to support the plane in the position shown in Fig. 1 with the telescopic sleeves partially distended.

Oil is supplied to the chamber 60 through passageways 68 in the upper plug 52 which bring the chamber 60 into communication with the exterior of the device. This passageway 68 is normally sealed by a plug 69. The fluid passes from the chamber 60 to the chamber 61 through a restricted opening or passageway 70 in the partition 55.

Air pressure is built up in the cylinder 51 by the reciprocation of the piston 62 due to the operation of the rod 63. As shown in the drawings, and particularly in Fig. 4, the plug 53 is provided with a passageway 74 which extends through the plug 53 and brings the chamber 67 into communication with the exterior of the device. The upper end of the passageway 74 is enlarged as at 75 providing a recess for a valve 76, the stem 77 of which extends into the passageway.

The valve 77 normally is maintained in a closed position by a spring 78 secured to the lower surface of the plug 53 by a screw 79 and connected by a link 80 with the lower end of the stem 77. The valve 77 may be provided with a sealing washer 81 to insure a tight seal between the valve and its seat.

The valve 77 prevents loss of fluid pressure from the chamber 67 on the down stroke of the piston 62 but permits air to be drawn from the exterior of the device into the chamber 67 on the up stroke of the piston 62. When the piston 62 moves down (toward the plug 53) air in the chamber 67 is compressed and will flow through a passageway 82 extending through the piston 62 into the chamber 61 whenever the pressure in the chamber 67 exceeds the pressure in the chamber 61. A valve 83 is mounted in an enlarged portion of the passageway 82 and acts as a check valve to prevent passage of fluid from the chamber 61 into the chamber 67, and to permit the passage of fluid from the chamber 67 to the chamber 61 whenever the pressure in the chamber 67 is greater than that of the chamber 61. The check valve 83 is retained in the passageway 82 by a retainer plate 84 which is secured in position on the upper surface of the piston by screws 85.

From the foregoing it will be seen that continued reciprocation of the piston 62 will gradually build up in pressure in the chambers 61 and 60. This pressure is limited by the minimum capacity of the chamber 67 which, in turn, is insured by reason of the provision of an annular recess 87 formed in the bottom wall of the piston 62. While the fluid pressure may be built up in the shock absorber or cushioning device by actuation of the plunger 63 prior to placing the unit in use, it also may be built up by the normal use of the unit, that is by movement of the plane across the ground, the unevenness of the ground combined with the movement of the plane resulting in the continued reciprocation of the plunger as will hereinafter become more apparent. After the initial pressure has been reached the desired pressure is maintained by normal reciprocation of the parts during the shock absorbing operation.

When the cushioning device is in use between two movable members, the pressure in the device normally tends to move the piston 62 toward its lowermost position (indicated in Fig. 3), thus tending to separate the movable members. When an impact or load is applied to the piston, as by movement of such members toward each other, it reacts against the fluid in the chamber 61 and causes the fluid to flow through the restricted opening 70 in the partition 55 to equalize the pressure in the chambers 60 and 61. The restriction of the passageway 70 in the partition 55 and the compressibility of the air in the chamber 60 results in a cushioning action. When the impact or load is relieved, the pressure in the chamber 60 forces oil back through the opening 70 into the chamber 61, thereby moving the piston to its lowermost position. Here again the restriction of the passageway 70 controls and cushions the movement of the parts. The movement of the piston under the shock absorbing impact not only reacts against the fluid in the chambers 61 and 60, but also reacts against the fluid of the air in the chamber 67 to maintain a predetermined minimum pressure in the chambers 60 and 61 as heretofore described. As long as the pressure in the chambers 60 and 61 does not fall below the pressure produced in the chamber 67, this chamber merely assists in the cushioning action. However, should the pressure in the chambers 60 and 61 fall below the pressure produced in the chamber 67, the latter will restore the pressure in the chambers 60 and 61.

The shock absorbing device 50, just described, is similar in one respect to the usual fluid shock absorbing devices, that is, it normally tends to separate the members between which it is connected. It will be remembered, however, that in the improved wheel mounting, the strut 18 normally tends to move the attaching members 31 and 36 toward each other. This is accomplished by positioning the shock absorbing or cushioning device 50 between the disc 40 of the sleeve 26 and the disc 42 of the sleeve 27.

As shown in Figs. 1 and 2, the piston rod 63 of the shock absorbing device 50 is secured to the disc 42 by a bolt 90 which passes through the disc and engages the outermost end of the rod 63. The plug 52 at the upper end of the cushioning device 50 is secured by a bolt 91 to the disc 40 of the sleeve 26. Thus the movement of the piston in a direction to move the piston rod 63 out of the device 50 separates the discs 40 and 42, thus moving the attaching members 31 and 36 toward each other and shortening the overall length of the entire unit.

While the cushioning or shock absorbing device 50 is well adapted for use in connection with the housing or harness mechanism 25, 26 and 27, it is nevertheless well adapted for other uses where it is desirable to provide a cushioning device which normally acts to separate the members to which it is attached. Likewise, other forms of cushioning or shock absorbing devices may be used in connection with the harness or housing of this invention. However, the particular arrangement and relationship of the housing and shock absorbing device illustrated is well adapted for use in connection with the landing gear of aeroplanes and provides a self-contained inexpensive unit which normally acts to bring the members to which it is attached toward each other and is so arranged that the normal travel of the plane across the ground, commonly known as taxiing, will result not only in the initial building up of the pressure in the device, but also in the maintenance of substantially constant pressure in the device throughout the entire period of use thereof.

I claim:

1. A landing gear for aeroplanes and the like comprising, a pair of wheels pivotally connected to the aeroplane for swinging movements toward and from each other, a load cushioning device pivotally interconnected between each of said wheels and the aeroplane, each device comprising a cylindrical housing, a pair of longitudinally extending substantially semi-cylindrical sleeves mounted within said housing, one of said sleeves being secured to said cylinder, connecting means secured to one end of said sleeve and extending from one end of said housing, the other of said sleeves being mounted for telescopic movement in said housing, connecting means secured to one end of said last mentioned sleeve and projecting from the other end of said housing, pivotal connections between one of said connecting means and the respective wheel and between the other of said connecting means and the aeroplane, and a cylindrical fluid pressure load cushioning means mounted between said sleeves and acting on the ends of the sleeves opposite the respective connecting means and normally tending to move the telescopically mounted sleeve into said housing and contract said device.

2. A landing gear for aeroplanes and the like comprising, a pair of wheels pivotally connected to the aeroplane for swinging movement toward and from each other, a cylinder, a pair of semi-cylindrical sleeves mounted in said cylinder facing each other and substantially forming a longitudinally split tube one of said sleeves being secured against movement relative to said cylinder and the other sleeve being mounted for axial movement relative to said cylinder, connecting means secured to one sleeve and projecting from said cylinder, a second connecting means secured to the other sleeve and projecting from the other end of said cylinder, one of said connecting means being attached to a wheel and the other being attached to the aeroplane, a cylindrical fluid pressure shock absorber device including a pair of telescoping members, fluid pressure responsive means within said device and normally tending to separate said telescoping members, said device being mounted in the tube formed by said sleeves and intermediate the ends thereof, means to secure one of the telescoping members to one of said sleeves at a point remote from its connecting means, and means to secure the other of said telescoping members to the other of said sleeves at a point remote from its connecting means, whereby the separation of the telescoping members tends to shorten the distance between said connecting members.

3. A harness for connecting a cylindrical load cushioning device between a pair of relatively movable members, said harness comprising a cylindrical housing, a tube mounted in said housing with its outer wall in contact with the inner wall of said cylinder, said tube being split axially to provide a pair of substantially semi-cylindrical sleeves, one of said sleeves being secured to said housing and the other sleeve being axially movable in said housing, a connecting device secured to one end of one sleeve and projecting from the corresponding end of said cylinder for attachment to one of the movable members, a second connecting device secured to the opposite end of the other sleeve and projecting from the corresponding end of said housing for attachment to the other movable member, and means at the end of each sleeve opposite its respective connecting device for attachment to a load cushioning device mounted within said tube, each of said members being positioned between the connecting device attached to its respective sleeve and the corresponding member of the other sleeve.

4. A harness for a load cushioning device or the like comprising, a cylinder, a pair of substantially semi-cylindrical sleeves mounted in said cylinder facing each other and substantially forming a longitudinally split tube, one sleeve being secured against movement relative to said cylinder and the other sleeve being mounted for axial movement relative to said cylinder, a disc-like member secured to each end of each sleeve and projecting across the tube formed by said sleeves, said sleeves being positioned in said cylinder with the discs on one sleeve positioned alternately relative to the discs on the other sleeve, connecting means secured to endmost discs and projecting from the opposite ends of said cylinder and adapted to be connected respectively to a pair of movable members between which the harness is to be positioned, and wherein the innermost discs slidably engage the inner wall of the opposite sleeve and are adapted to be engaged by a cylindrical load cushioning device mounted therebetween.

5. A shock absorbing or cushioning device for use between two relatively movable members comprising, a cylinder, a pair of semi-cylindrical sleeves mounted in said cylinder and in engagement with the internal wall thereof, one of said sleeves being secured to said cylinder, means attached to the last mentioned sleeve for attachment to one of the movable members, the other sleeve being reciprocally mounted in said cylinder, means attached to the last mentioned sleeve and extending from the opposite end of the cylinder for securing said sleeve to the other of said movable members, each of said sleeves carrying a disc-like member extending across the interior of said sleeves and slidingly engaging the inner wall of the other sleeve, said members being positioned at the ends of their respective sleeves opposite to the respective attaching means, and a fluid load cushioning and supporting device mounted between said members.

6. A shock absorbing or cushioning device for use between two movable members including, an elongated housing closed at its ends and adapted to be secured to one of the members, means fixed relative to said housing and extending thereacross to divide the housing into a pair of axially extending chambers positioned in an end to end relationship with each other, attaching means carried by said cylinder for longitudinal movement and projecting through one end thereof for attachment to the other movable members, a piston carried by said last named means, said piston being positioned in and dividing the chamber remote from the attaching means into a pair of sub-chambers, a passageway through said piston, a check valve in said passageway to prevent the flow of fluid from the sub-chamber adjacent the undivided chamber into the other sub-chamber, a passageway between the last mentioned sub-chamber and the exteriors of the device, a check valve in said last named passageway normally acting to prevent the flow of fluid from the interior to the exterior of the device, and a restricted passageway between the undivided chamber and the adjacent sub-chamber.

7. A load cushioning and supporting device comprising, a cylindrical housing, an axially split tube mounted in said cylinder with its outer wall in contact with the inner wall of said cylinder and providing a pair of sleeves, one of said sleeves being secured against movement relative to said cylinder and the other sleeve being axially slidable in said cylinder, attaching means secured to one end of one sleeve and projecting from the corresponding end of said cylinder for attachment to one of a pair of movable members, a second attaching means secured to the opposite end of the other sleeve and projecting from the corresponding end of said cylinder for attachment to the other of the movable members, a cylinder having closed ends mounted in said tube and secured to one of said sleeves, a piston in said cylinder and projecting through one end thereof and secured to the end of the movable sleeve opposite to the attaching means thereof, and fluid under compression in said last named cylinder and normally acting on said piston to move said piston rod away from the coacting cylinder.

LUCIEN ROBERT GRUSS.

REFERENCES CITED

The following references are of record in the file of this patent:

UNITED STATES PATENTS

| Number | Name | Date |
|---|---|---|
| 2,174,315 | Dowty | Sept. 26, 1939 |
| 2,336,203 | Warner | Dec. 7, 1943 |

FOREIGN PATENTS

| Number | Country | Date |
|---|---|---|
| 378,781 | Italy | Feb. 24, 1940 |
| 670,589 | France | Aug. 19, 1929 |